Oct. 14, 1952  W. H. GRAYBILL  2,613,590
BALE TENSION MEANS
Filed March 19, 1948

INVENTOR.
Wilbur H. Graybill
BY
James Atkins
ATTORNEY.

Patented Oct. 14, 1952

2,613,590

UNITED STATES PATENT OFFICE 2,613,590

BALE TENSION MEANS

Wilbur H. Graybill, Lititz, Pa.

Application March 19, 1948, Serial No. 15,819

7 Claims. (Cl. 100—43)

This invention relates to hay or straw bale tension means.

The invention is more particularly concerned with an attachment for use with existing makes of hay or straw balers and is adapted for automatic operation in the maintenance of substantially uniform tension in the bales formed by the balers.

Balers of this type as now in use comprise, generally, a feed hopper from which extends a bale-forming box-like structure and into and through which the hay or straw is forced by a reciprocable plunger. Such balers also include in the box-like structure a pair of tension rails at each side thereof, and these rails are pivotally supported at their front ends and have manual adjusting means associated with their rear ends for moving the rear ends toward or from the longitudinal central vertical plane of the box-like structure in the provision of a variable resistance to the flow of hay or straw through the structure under the action of the plunger, which results in a corresponding variation in the density as well as the weight of the bales.

The adjustment of the tension rails is effected manually and several adjustments often must be made in a single baling operation of any substantial duration.

The primary object of this invention is the provision of adjusting means for the tension rails, which is wholly automatic in operation and which is controlled by lateral pressure of the bales at a point adjacent the hinged ends of the tension rails.

A further object of the invention is the provision of automatic tension rail-adjusting means of the character above noted, which is capable of manual adjustment for varying the control by the bale pressure with a corresponding variation in the tension of the bales.

A further object of the invention is the provision of tension rail-adjusting means, which is relatively simple in construction and which is capable of being operatively associated with hay or straw balers now in use with a minimum expenditure of time and money.

Other objects and advantages of the invention will become apparent in the course of the following detailed description taken in connection with the accompanying drawing, wherein—

Figure 1:
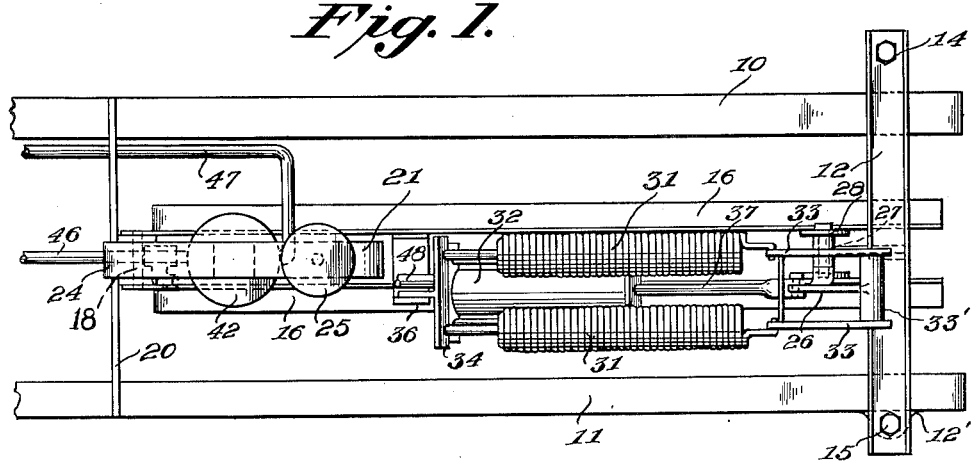
Figure 1 is a side elevational view of the bale-forming end of a hay or straw baler and showing the application of the invention thereto.

Referring now in detail to the drawing by use of reference numerals, 10 designates the top and 11 the bottom guide plate embodied in the elongated box-like structure in which the hay or straw bales are formed and through which they are forced by the usual and well known reciprocatory plunger.

Upright beams 12 and 13 are disposed at opposite sides of the plates and adjacent the rear ends thereof, and such beams are loosely connected by bolts or rods 14 and 15 at their upper and lower ends, respectively, the latter rod preferably extending through lugs 12' on the bottom of the lower plate 11.

The tension rails 16 and 17 comprise a pair 16 at one side and a like pair 17 at the opposite side and the rails of each pair are in parallel vertically spaced relation and are disposed intermediate the top and bottom plates 10 and 11.

The tension rails are pivoted at their front ends by pivot pins 18 extending through lugs 19 supported by a vertical bar 20 at each side, and having their upper and lower ends suitably connected to the upper and lower plates 10 and 11.

A pressure shoe 21 is disposed between the tension rails 16 and has its front end pivotally supported on the adjacent pivot pin 18.

The pressure shoe is relatively short as compared with the length of the tension rails, and is adapted for contact by the adjacent side of a bale under formation, and which, by lateral pressure of the bale, acts as a feeler to set the tension rail adjusting means into operation.

The shoe 21 is yieldably biased inwardly or toward the bale by means of a spring 22, one end of which engages the shoe and the other end of which is engaged by an adjusting rod 23 having a threaded connection in a bracket 24, and which rod is provided with a manipulating knob 25.

Figure 2:
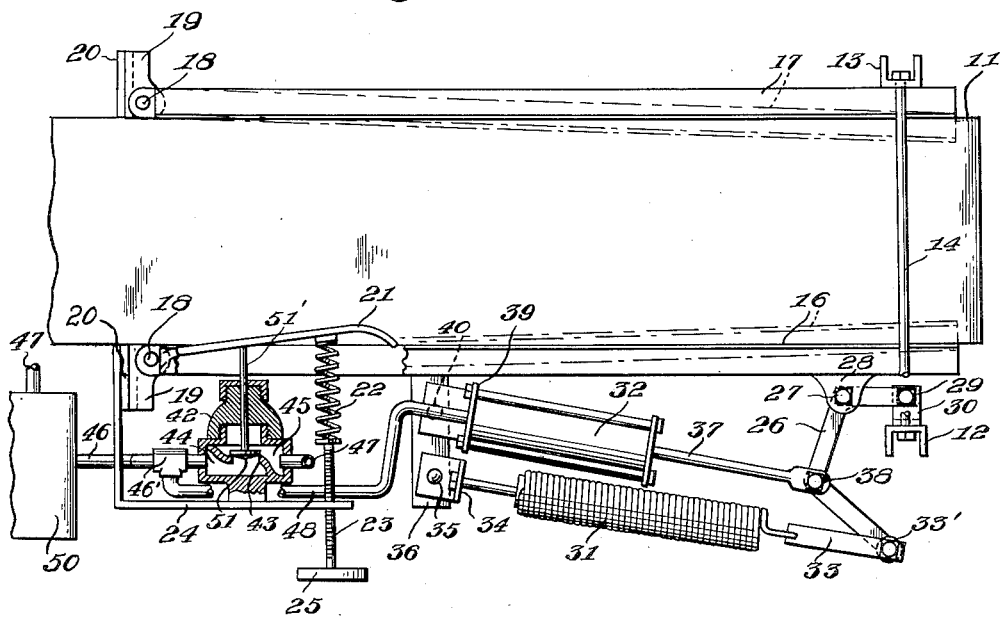
Figure 2 is a top plan view of the structure of Figure 1 with the top plate removed.

The shoe 21 normally rests with its rear curved end approximately one-half inch inward from the inner faces of rails 16. In Fig. 2, however, such shoe is moved outwardly from normal position sufficient to close valve 51, later referred to.

Lateral movement of the tension rails is effected by means comprising a generally U-shaped angular lever 26 which is pivotally connected at 27 to lugs 28 suitably connected to the tension rails 16 adjacent their rear free ends. The lever 26 is further pivotally connected at one free end thereof, as at 29, to a lug 30 connected to the upright 12.

A pair of relatively heavy coil springs 31 and a hydraulic cylinder 32 are positioned between the lever and the shoe 21. The springs 31 are connected at their rear ends to corresponding ends of straps 33 whose opposite ends are pivotally connected to a boss 33' forming the opposite free end of the lever 26.

The front ends of the springs 31 are connected to a bracket 34 which is pivotally connected, as at 35, to a support 36, which is preferably secured to rails 16.

The cylinder 32 houses a suitable piston which is provided with a piston rod 37 whose free end is pivotally connected, as at 38, to the lever 26 intermediate the pivotal connections 27 and 33'.

The front end of the cylinder 32 is rigidly supported by a bracket 39 which is pivotally connected at 40 to the aforementioned support 36.

A valve structure 42 is suitably supported by the bracket 24 and is disposed intermediate the pivotal connection 18 and the spring 22.

The valve structure includes a valve seat 43 which is disposed intermediate chambers 44 and 45 in the valve body. An oil feed pipe 46 communicates with chamber 44 and an oil return pipe 47 communicates with chamber 45. A union 46' is provided in pipe 46 and from which a pipe 48 extends to and communicates with the cylinder 32.

The pipes 46 and 47 extend from and to an oil reservoir 50 which, in practice, is provided with a suitable well known form of pump for circulating the oil through the pipes abovementioned. A valve 51 cooperates with seat 43 and is provided with a stem 51'.

Having set forth in detail the structure entering into the improved device in accordance with a preferred embodiment thereof, the operation is as follows:

The springs 31 normally hold the rails 16 and 17 in their closed or inner position, as is indicated by dot and dash lines in Fig. 2, and which is effected by lever 26 pivoting about connection 38 and moving clockwise, thereby effecting a lateral separation of lugs 28 and 30 whereby rails 16 are moved inwardly. Rails 17 will be likewise moved inwardly by rods 14 and 15 moving the upright 13 inwardly, and which upright engages the rails 17.

With the rails in their inner position, a maximum resistance will be offered to forward movement of the hay or straw with a resulting maximum compression thereof.

The pressure shoe 21 is adjusted by rod 23 to yieldably engage a side of the hay bales being formed, and the inward urge of the shoe may be varied in accordance with the desired tension in the bales.

The shoe 21 presses into the side of the bale to a depth depending upon the density of the bale as well as upon the adjusted tension of spring 22, and upon increase of pressure of the bale upon the shoe it will move outwardly against the urge of spring 22.

Upon outward movement of the shoe, it will engage the valve stem 51' and move the valve 51 toward or to valve seat-engaging position, as is shown in Fig. 2.

The valve 51, when shoe 21 is not engaged with stem 51', is held open by pressure of the oil which is being constantly pumped from reservoir 50, through pipe 46, chambers 44 and 45 and pipe 47 back to the reservoir.

When the valve is closed, however, as shown in Fig. 2, oil will be forced through the by-pass pipe 48 into the cylinder 32, whereby the rod 37 will be moved outwardly and the lever 26 rotated to move lug 28 and together therewith the rails 16 outwardly. As rails 16 are moved outwardly, upright 12 will be moved inwardly, and thus the upright 13 will be permitted outward movement under pressing action by the adjacent sides of the bales.

It is, of course, to be noted that the range of movement of the tension rails is exaggerated on the drawing, as in actual practice substantially slight movement is required to effect a substantial change in bale tension.

It is to be further noted that when the valve 51 is only partially closed, the rails will be moved to positions intermediate those indicated on the drawing.

The tension in the bales may also be readily varied by adjusting the pressure in spring 22 with any given relative position of the opposed rails 16 and 17.

While I have disclosed my invention in accordance with a single specific embodiment thereof, such is to be considered as illustrative only, and not restrictive, the scope of the invention being defined in the following claims.

What I claim and desire to secure by U. S. Letters Patent is:

1. An attachment for hay or straw balers having laterally opposed pairs of tension rails pivotally supported at their front ends; comprising lever means operatively engaged with the rear free ends of the pairs of rails for moving same toward and from each other in effecting variation in the density of the bales, spring means operatively engaged with said lever means for normally urging the pairs of rails toward each other, movable bale-engageable means in advance of the free ends of the rails, adjustable spring means urging said movable bale-engageable means into engagement with the bales, and connections between the lever means and said bale-engageable means and engaged with the lever means for positively moving said rails apart upon increased density in the bales.

2. The structure according to claim 1, wherein said connections comprise a hydraulic cylinder, and valve means engageable by said bale-engageable means for controlling flow of fluid into said cylinder.

3. In a hay or straw baler having a pair of vertically spaced tension rails at each side thereof and pivotally supported on a vertical pin at their front ends, a vertical upright disposed adjacent the rear free ends of each pair of rails, rods loosely interconnecting the uprights, a generally U-shaped lever pivotally connected at one free end thereof to one of said uprights and pivotally connected adjacent said first pivotal connection to one of the pairs of rails, spring means engaged with the other free end of the lever and operative to move the opposed pairs of rails toward each other, a movable pressure shoe disposed adjacent the vertical pin which pivotally supports one of the pairs of rails and engageable with a bale being formed, and connections between the pressure shoe and lever and operative to move the opposed pairs of rails away from each other upon increased density in the bales being formed.

4. The structure according to claim 3, wherein said connections comprise a hydraulic cylinder having a piston rod connected to said lever, fluid supply means, and a fluid control valve operative by said pressure shoe upon movement thereof as effected by pressure of a bale thereon.

5. The structure according to claim 3, wherein said pressure shoe has one end thereof pivotally supported on the pivot pin for the adjacent pair of rails, and the other end of the shoe is free and curved laterally outwardly of the adjacent pair of rails.

6. The structure according to claim 3, together with adjustable spring means bearing upon the pressure shoe adjacent one end thereof.

7. Hay or straw bale tension-regulating means comprising a tension rail engageable with each side of a bale being formed, spring means normally moving the rails toward each other to effect greater tension in the bales, a laterally movable elongated shoe member engageable by a side of a bale being formed, adjustable spring means bearing on said shoe and urging same into engagement with the bales, and connections operative by said shoe member for moving the rails away from each other to reduce the density in the bales.

WILBUR H. GRAYBILL.

REFERENCES CITED

The following references are of record in the file of this patent:

UNITED STATES PATENTS

| Number | Name | Date |
|---|---|---|
| 736,653 | Trabue | Aug. 18, 1903 |
| 1,830,623 | Rollman | Nov. 3, 1931 |
| 2,139,928 | Blewett | Dec. 13, 1938 |
| 2,396,720 | Nolt | Mar. 19, 1946 |
| 2,478,012 | Raney | Aug. 2, 1949 |
| 2,494,033 | Burkett | Jan. 10, 1950 |